3,669,789

METHOD OF MAKING PLASTIC FIBER-OPTICAL PLATES

Filed March 23, 1970

INVENTORS
MIKIO UTSUGI
TAKAHIRO OHTA

BY Sughrue, Rothwell, Mion, Zinn & Macpeak

ATTORNEYS

United States Patent Office 3,669,789
Patented June 13, 1972

3,669,789
METHOD OF MAKING PLASTIC FIBER-OPTICAL PLATES
Mikio Utsugi and Takahiro Ohta, Minami-ashigara-machi, Kanagawa, Japan, assignors to Fuji Photo Film Co., Ltd., Minami-ashigara-machi, Kanagawa, Japan
Filed Mar. 23, 1970, Ser. No. 21,741
Claims priority, application Japan, Mar. 22, 1969, 44/21,779
Int. Cl. B29d 11/00; B32b 31/00
U.S. Cl. 156—182     1 Claim

ABSTRACT OF THE DISCLOSURE

A method of making plastic fiber-optical plates by laminating a number of transparent plastic sheets using layers of an adhesive having a low refractive index, slicing the resulting laminated block to form thin sheets and laminating the thin sheets using layers of an adhesive having a low Refractive Index is disclosed.

BACKGROUND OF THE INVENTION

(1) Field of the invention

This invention relates to a method of making plastic fiber-optical plates. More particularly, this invention is concerned with a method of making plastic fiber-optical plates by laminating a number of transparent plastic sheets using layers of an adhesive having a low Refractive Index, slicing the resulting laminated block to form thin sheets and laminating the thin sheets using layers of an adhesive having a low Refractive Index.

(2) Description of the prior art

In a prior method of making fiber-optical plates by regularly arranging a large number of glass fiber-optical elements, the arrangement of the elements is very difficult, requiring a great deal of labor and time. Accordingly, it is difficult to make fiber-optical plates on a large scale at a moderate price by this prior method. In spite of the versatility of fiber-optical plates, actual use of the fiber-optical plates prepared by the prior method is restricted to certain specific applications because of these drawbacks.

An object of the present invention is to provide plastic fiber-optical plates which can be made in quantity at a moderate price.

DESCRIPTION OF THE INVENTION

The structure of the fiber-optical plate made by the method of the present invention greatly differs in that each element is in a tetragonal prismic form in contrast to the prior art fiber-optical plates in which each element is cylindrical. In the plate of the present invention, cores made of plastic sheets are separately covered by a layer of an adhesive having a lower Refractive Index than the Refractive Index of the plastic sheets and are quite tightly packed to form a plate.

The method of making fiber-optical plates in accordance with the present invention will be illustrated in greater detail hereinafter with reference to the accompanying drawings.

DETAILED DESCRIPTION OF THE INVENTION

Figure 1:
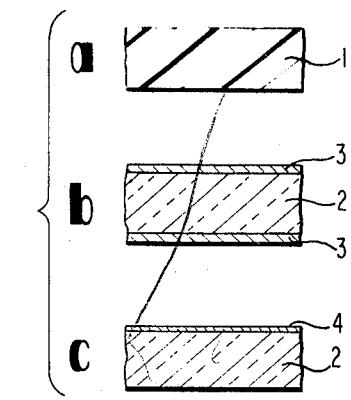
FIGS. 1(a), 1(b), and 1(c) are cross-sectional views of different plastic sheets used in the present invention
Figure 2:
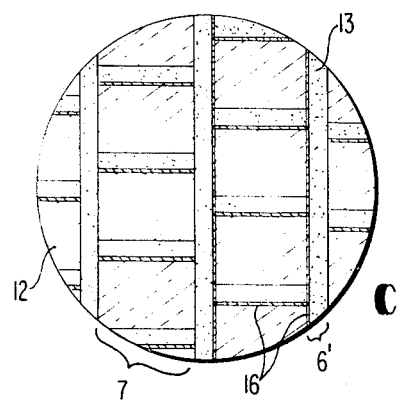
FIG. 2 is an oblique view of a block formed by laminating a number of webs of the plastic sheet.
Figure 2:
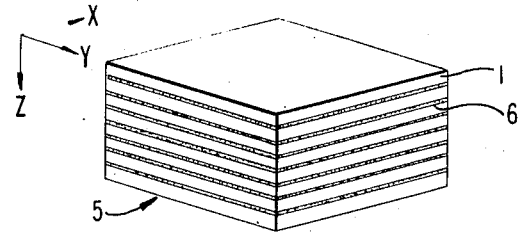

The plastic sheet 1 is made preferably of a plastic material having a relatively high Refractive Index such as, for example, polyesters, polycarbonates, polystyrene or acrylic resins. In addition to a single-layered plastic sheet 1, as shown in FIG. 1(a), a multi-layered sheet having layers 3 of a low Refractive Index on a transparent base 2, as shown in FIG. 1(b), and a metallized plastic sheet having a vacuum metallized layer 4 of a high reflective metal on a transparent base 2, as shown in FIG. 1(c), can be used. In particular, the sheet having a vacuum metallized layer 4, as shown in 1(c), required no special treatment with respect to the adhesive layer, described hereinafter, and a good result is obtained when a plate consisting of fiber-optical elements of a fairly large size as from 1 to a few millimeters is used in display. A number of webs of the transparent plastic sheet 1 are laminated using transparent adhesive layers 6, having a lower Refractive Index than the plastics forming the sheet 1, to form a laminated plastic block 5, as shown in FIG. 2. The adhesive layers 6 can be formed by applying a solution-type adhesive to the base 1 and drying the coating layers after lamination of a number of webs of the base sheet 1. Alternatively, a sheet of a thermally fusible adhesive is interposed between adjacent layers of the sheet 1 and the resulting laminate is hot pressed into a coherent body. In all cases, it is necessary that the base 1 and adhesive layer 6 be mechanically bonded to each other and, from an optical point of view, be so different in Refractive Index that incident rays over a certain incidence angle from the sheet 1 into the adhesive layer 6 are totally reflected on the intersurface therebetween.

The thickness of the laminate is determined by the desired dimensions for the fiber-optical plate. For the sake of explanation, the axis of coordinates X, Y and Z are set. Laminating the sheets 1 using adhesive layers 6 on the X-Y plane, a stripe-pattern of a cross-section of the sheets 1 and adhesive layers 6 results in the Y-Z plane. One edge of the resulting fiber-optical plate is parallel to the axis Z and the other adjoining edge is parallel to the axis Y. Accordingly, the Y-Z plane is parallel to the surface of the resulting fiber-optical plate. For ordinary uses, the necessary thickness of lamination in the Z direction is from a few centimeters to 20 cm. When the thickness of a sheet 1 is 175 microns and the thickness of an adhesive layer is 25 microns, a laminate of a thickness of 10 cm. is obtained by laminating 500 sheets of the plastic sheet 1.

Figure 3:
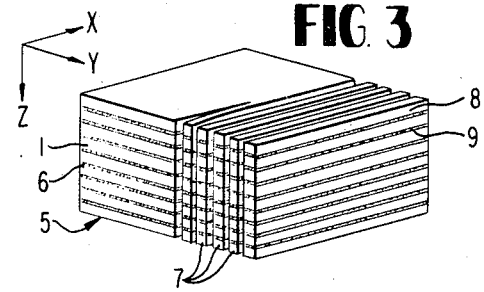
FIG. 3 is an oblique view showing the course of forming a number of thin sheets by slicing the block.

The laminated plastic block 5 is sliced in the same thickness as the thickness of the sheet 1 parallel to the Z-X plane by means of a planer to form a number of sheets 7 having a stripe pattern. As shown in FIG. 3, sheet 7 consists of prismic members 8 formed from the transparent, high refractive plastic sheet 1 bonded side by side through adhesive layers 9.

Figure 6:
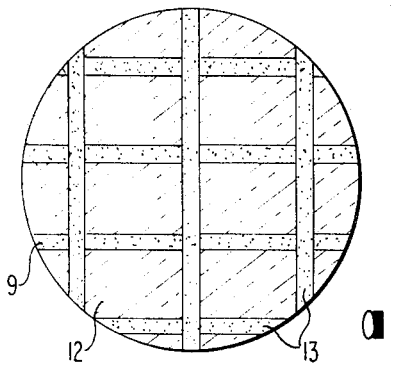
FIGS. 6(a), 6(b), and 6(c) are enlarged views of the fiber-optical plates showing the structures of the plates.
Figure 6:
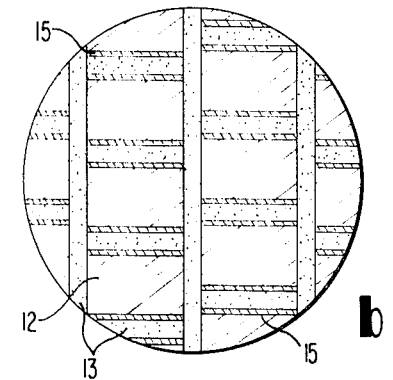
Figure 4:
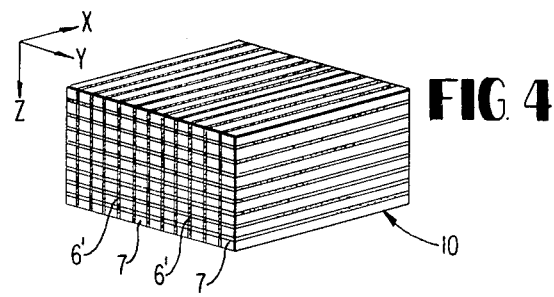
FIG. 4 is an oblique view of a block formed by laminating the thin-sliced sheets.
Figure 5:
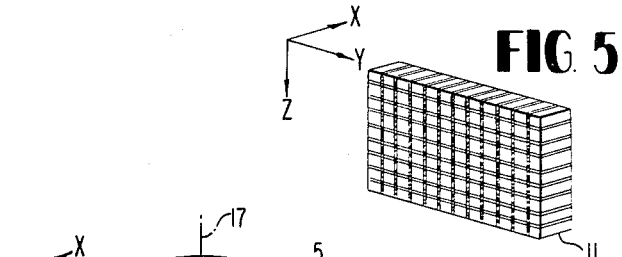
FIG. 5 is an oblique view of a fiber-optical plate sliced off from said block.
Figure 7:
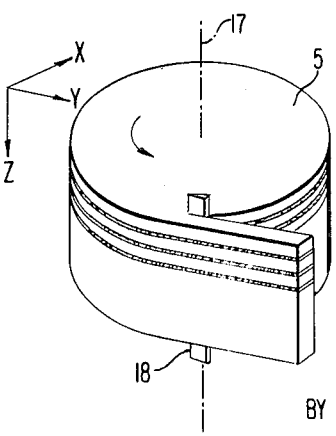
FIG. 7 is an oblique view showing a process for making a long length slice sheet.

As shown in FIG. 4, slice sheets 7 are laminated in the Y direction through transparent adhesive layers 6 in the manner as described above. On lamination, it is necessary to take care that the stripe pattern 8, 9 of slice sheet 7 is parallel to that of the adjacent sheet. FIG. 4 shows a laminated block 10 thus formed. Block 10 is cut into the desired thickness parallel to the Y-Z plane and both surfaces of a plate thus cut are smoothed to form a plastic fiber-optical plate as shown in FIG. 5. Smoothing of the surface can be by buffing or by application of a transparent plastic layer. The microstructure of the fiber-optical plates thus finished is shown in FIG. 6. As shown in FIG. 6(a), transparent prismic plastic members 12 constitute fiber-optical cores, adhesive layers 13 having a lower Refractive Index than 12 constitute a matrix, and the members are in the most compact arrangement. It is unnecessary that the stripe 9 of a sheet 10 7 coincide in position with those of the adjacent sheet.

FIG. 6(b) shows the structure of a product produced using a multi-layered sheet as shown in FIG. 1(b), in which cores 12 of a transparent, relatively high refractive plastic are covered by coating layer 13 and 15 of a low Refractive Index. FIG. 6(c) is the microstructure of a product produced using a metallized sheet as shown in FIG. 1(c). In this case, the slice sheets 7 are laminated using adhesive layer 6 after vacuum metallization to form metallic layer 16. In this product, each of the prismic transparent plastic cores is covered by a reflective metallic layer, and, in this case, the adhesive layer 13 can be of the same Refractive Index as cores 12 and an adhesive formed of a plastic of the same type as plastic 12 can be used.

A long length slice sheet is obtained by slicing a laminated block 5 by means of a blade 18 while revolving the block 5 on the axis 17 positioned at the center of the X-Y plane.

EXAMPLE 1

A laminated block was formed of a polyester film of a thickness of from 100 to 200 microns (Refractive Index—1.65) using an adhesive, a solution of a copolymer of isophthalic acid, triethylene glycol and ethylene glycol ($n=1.55$) in an aromatic hydrocarbon solvent containing phenol, and hot pressing the laminate at about 130° C. A sheet of vinyl chloride-vinyl acetate copolymer ($n=1.55$) can be used as a thermally fusible adhesive in place of the cement-type adhesive. It is somewhat difficult to slice the block because of a high mechanical strength thereof. Since the Refractive Index of a stretched polyester film in the direction of the thickness is lower than that in the other directions and is about 1.55, thus, it is necessary to use an adhesive layer having as low Refractive Index as possible.

EXAMPLE 2

A laminated block was formed using a stretched polystyrene film of a thickness of from 150 to 300 microns (Refractive Index—1.6) and a cellulosic adhesive ($n=1.49$ to 1.50) or a vinyl acetate adhesive ($n=1.45$ to 1.47). In this case, it was necessary to hot press at a temperature below 100° C.

EXAMPLE 3

A poly (methyl methacrylate) sheet ($n=1.57$) was used. Since it was difficult to obtain a poly (methyl methacrylate) sheet of the desired thinness, those of a thickness of several hundred microns to a few millimeters were used to form fiber-optical plates which gave colorful, bright and attractive display effect when used in an electroluminous indicator or in display.

A solution of methacrylate polymer and vinyl acetate polymer in an organic ester was used as an adhesive. A hot press at 50 to 60° C. was necessary. A large scale fiber-optical plate having large fiber-optical elements was made from a poly (methyl methacrylate) sheet having a vacuum metallized layer of aluminum and this exhibited a good display effect.

As described above, the method of making fiber-optical plates by lamination of plastic sheets is easy and suitable for multiple production in comparison with the method of making the same by regular arrangement of numerous glass filaments. By forming a laminated block, a number of fiber-optical plates are obtained from the block. Unexpectedly good results were obtained when a plastic sheet having a reflective metallized layer of, e.g., aluminum was used.

Although the plastic fiber-optical plate in accordance with the present invention has some disadvantages in that it is inferior in phototransmission to glass fiber-optical plates because of the low transmission factor of the plastics, in that it has a relatively small resolving power because of the coarseness of the fiber-optical element and in that it has low thermal and mechanical strength, it has important advntages in that it is suited for mass production and in that it can be manufactured on a large scale at a moderate price. Accordingly, it is widely applicable in copying where a high resolving power is not required, as an image recorder and a viewer tightly fitted to the front of a Braun tube in a television set or in display use.

What is claimed is:

1. A method of making fiber-optical plates comprising applying a high reflective vacuum metallized layer to one surface of each of a plurality of sheets of transparent plastic material, laminating said plurality of sheets using a transparent adhesive, slicing the resulting laminate in a plane perpendicular to the plane of lamination, applying a high reflective vacuum metallized layer on one surface of each of the sliced sheets, laminating said sliced sheets using a transparent adhesive to form a block, and cutting said block in a suitable thickness in a plane perpendicular to the plane of lamination to provide a plurality of fiber-optical plates.

References Cited

UNITED STATES PATENTS

| | | | |
|---|---|---|---|
| 3,235,428 | 2/1966 | Naymik | 156—250 X |
| 2,992,516 | 7/1961 | Norton | 156—296 X |
| 2,992,956 | 7/1961 | Batinet, Jr. | 156—296 X |
| 3,498,864 | 3/1970 | Ogle | 156—296 X |

CARL D. QUARFORTH, Primary Examiner

R. E. SCHAFER, Assistant Examiner

U.S. Cl. X.R.

156—254, 264, 151, 304; 350—96 R